(12) United States Patent
Hakkinen et al.

(10) Patent No.: US 7,116,651 B2
(45) Date of Patent: Oct. 3, 2006

(54) METHOD AND APPARATUS FOR HS-DPCCH SIGNALLING WITH ACTIVITY INFORMATION IN HSDPA

(75) Inventors: Hannu Hakkinen, Espoo (FI); Esa Malkamäki, Espoo (FI)

(73) Assignee: Nokia Corporation, Espoo (FI)

( * ) Notice: Subject to any disclaimer, the term of this patent is extended or adjusted under 35 U.S.C. 154(b) by 8 days.

(21) Appl. No.: 10/666,920

(22) Filed: Sep. 19, 2003

(65) Prior Publication Data

US 2004/0202147 A1 Oct. 14, 2004

Related U.S. Application Data

(60) Provisional application No. 60/412,620, filed on Sep. 20, 2002.

(51) Int. Cl.
*H04Q 7/00* (2006.01)

(52) U.S. Cl. .................. 370/329; 370/439; 370/458
(58) Field of Classification Search ................ 370/438, 370/439, 458, 496, 522, 524, 329, 229, 28, 370/349
See application file for complete search history.

(56) References Cited

U.S. PATENT DOCUMENTS

| | | | |
|---|---|---|---|
| 6,643,272 B1 | 11/2003 | Moon et al. | |
| 6,925,561 B1 * | 8/2005 | Hunt et al. | 713/169 |
| 2002/0159410 A1 * | 10/2002 | Odenwalder et al. | 370/329 |
| 2003/0040315 A1 | 2/2003 | Khaleghi et al. | |
| 2003/0043764 A1 | 3/2003 | Kim et al. | |
| 2004/0004954 A1 * | 1/2004 | Terry et al. | 370/349 |

OTHER PUBLICATIONS

Power Control for Fast Cell Selection in HSDPA; TSG-RAN Working Group 1 meeting #18; Boston, Massachusetts; Jan. 15–18, 2001.
Reduction of HS–DPCCH power requirements; 3GPP TSG RAN WG1#27; Oulu, Finland, Jul. 2–5, 2002.
Change Request 25.212 CR; 3GPP TSG–RAN WG1 Meeting #27; Oulu, Finland, Jul. 2–5, 2002 (with repeat).
Change Request 25.214 CR; 3GPP TSG–RAN WG1 Meeting #27; Oulu, Finland, Jul. 2–5, 2002 (without repeat).
Reduction of HS–DPCCH power requirements; 3GPP TSG RAN WG1#28; Seattle, Washington; Aug. 19–22, 2002.
Change Request 25.214 CR; 3GPP TSG–RAN WG1 Meeting #28, Seattle, Washington, USA, Aug. 19–22 (no repeats).
Change Request 25 . . . 214 CR; 3GPP TSG–RAN WG1 Meeting #28, Seattle, Washington, USA, Aug. 19–22 (with repeats).

* cited by examiner

*Primary Examiner*—Seema S. Rao
*Assistant Examiner*—Robert C. Scheibel, Jr.
(74) *Attorney, Agent, or Firm*—Ware, Fressola, Van Der Sluys & Adolphson LLP (57) ABSTRACT

A method (100) and corresponding equipment, the method for enabling a Node B/base station (14) to distinguish different states—HARQ active states and a DTX (non-transmitting) state—of a UE (12) in respect to use of the feedback HSDPA (high-speed downlink packet access) channel HS-DPCCH over which the UE (12) sends acknowledgement messages (ACK/NACK) to the Node B (14) in response to receiving packets via the HSDPA (downlink) data channel HS-DPCH, the method including steps (41 42) in which the UE (12) additionally sends preamble symbols if an acknowledgement message (ACK/NACK) is to be sent in a next time interval but not in the current time interval, and at least one postamble symbol prior to the UE (12) entering the non-transmitting state (DTX).

34 Claims, 4 Drawing Sheets

METHOD AND APPARATUS FOR HS-DPCCH SIGNALLING WITH ACTIVITY INFORMATION IN HSDPA

CROSS REFERENCE To RELATED APPLICATION

Reference is made to and priority claimed from U.S. provisional application Ser. No. 60/412,620, filed Sep. 20, 2002, and entitled HS-DPCCH SIGNALLING WITH ACTIVITY INFORMATION IN HSDPA.

TECHNICAL FIELD

The invention relates to signalling between communication terminals, and more particularly to signalling by a signal-transmitting entity to indicate to a signal-receiving entity whether the signal-transmitting entity is about to enter one or another signalling states, such as discontinuous mode or one or more active signalling modes. For example, the invention is of use in HSDPA by which packet data are downlinked in UTRAN WCDMA according to Release 5 specifications, and more particularly it is of use in uplink feedback signalling for controlling HSDPA retransmissions of misreceived packets.

BACKGROUND OF THE INVENTION

HSDPA (High Speed Downlink Packet Access) for WCDMA (Wideband Code Division Multiple Access), a key new feature of Release 5 3GPP (Third Generation Partnership Program) technical specifications for UTRAN (Universal Mobile Telecommunications System Terrestrial Radio Access Network) of type FDD (frequency division duplex), makes possible increased packet data throughput—compared to what is possible using DCH (the dedicated channel), DSCH (the downlink shared channel) or FACH (the forward access channel)—by means of fast physical layer (L1) retransmission and transmission combining and also fast link adaptation, both controlled by the Node B/base transceiver station, not the radio network controller (RNC). The fast physical layer retransmission and transmission combining is part of a so-called HARQ (hybrid automatic repeat request) process, in which, in what is called incremental redundancy (IR), a wireless terminal stores received data packets in soft memory, and if decoding has failed, a retransmission is combined with the failed one before again attempting decoding. Besides soft combining related to retransmission in general, IR also includes soft combining where different versions of redundant encoded data are sent on each (re)transmission. (In basic and alternative so-called Chase combining mode, each retransmission contains an identical copy of a first transmission, which is also then "soft-combined" with earlier received symbols before attempting new decoding.)

With HSDPA, two features used generally in WCDMA—variable SF (spreading factor) and fast power control—are disabled and replaced by adaptive modulation and coding, multi-code operation, and HARQ. In addition, scheduling decisions (i.e. scheduling channel resources for downlinking packets) are made in the Node B (not the RNC), with a strategy of providing increased throughput by allowing most of the cell capacity to be allocated to a single user for a very short time, under some circumstances.

Figure 1:
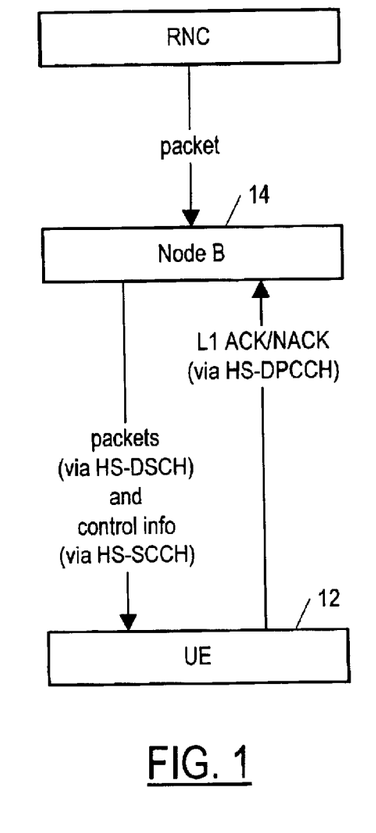
FIG. 1 is a block diagram showing feedback signalling by a UE to a Node B, in respect to data (packets) transmitted to the UE by the Node B.

As shown in FIG. 1, in HSDPA packet data are downlinked using HS-DSCH (high-speed downlink shared channel) for the packet data itself and HS-SCCH (high-speed shared control channel) is used for the corresponding physical layer control information (code allocation and decoding information, and that information also supports soft combining in case of retransmission). HS-DPCCH (high-speed dedicated physical control channel) is used by the terminal to convey to the Node B ACK/NACK signalling (positive and negative ARQ acknowledgements), and feedback information on the quality of the downlink.

Communication over the HSDPA channels occurs as frames of subframes provided during TTIs (transmission time intervals), i.e. one subframe is one TTI (2 ms for HSDPA). A single subframe on HS-DPSCH may be used to convey a data packet. In order for a terminal to be able to decode a data packet in a subframe on HS-DPSCH, it must first receive an indication on HS-SCCH that the packet is intended for it as well as information needed for demodulating allocated code channels. That information is provided in the first of two parts making up an HS-SCCH subframe. The first part carries information for use in configuring physical level reception of relevant codes (allocated code channels and applied modulation). The second part provides HARQ information, needed for decoding a data transmission in case either the packet is in a first transmission or in a retransmission. The HARQ information in the second part makes it also possible to soft-combine the latest transmission with the already-received earlier transmission(s), before making new attempt of coding. Therefore, so that a terminal has what it needs in time to decode a packet intended for it, the control information is transmitted ahead of the packet, although the number assigned to the packet subframe (on HS-DSCH) is the same as the number assigned to the subframe conveying the control information (on HS-SCCH). Similarly, the L1 ACK/NACK signalling on HS-DPCCH for a packet is in a subframe assigned the same number as for the packet, but obviously occurs later in time, after the packet is received (either successfully, i.e. is decoded, or unsuccessfully).

It turns out that especially when a UE is in soft handover, it is more difficult for a Node B in communication with the UE to distinguish between ACK/NACK signalling by the UE over the HS-UP, i.e. when the UE is in a HARQ active state, and when the UE is not in a HARQ active state. When a UE is not in a HARQ active state, it enters what is called discontinuous transmission (DTX) mode. To avoid requiring that the UE transmit at a power level that for most time intervals would be unnecessarily high, the prior art proposes using preamble and postamble signalling to in effect more clearly enunciate to the Node B signalling associated with a HARQ active state and signalling associated with a DTX mode. (See e.g. 3GPP TSG-RAN WG1 Meeting #28, Washington, USA, 19–22 August 2002, Change Request R1-02-1085, entitled *Correction of DTX transmission in ACK/NACK field*.) According to the preamble and postamble signalling proposed by the prior art, when a UE receives signalling information directed to it on HS-SCCH, the UE would transmit a NACK in the subframe before the subframe allocated to the HARQ ACK/NACK. In addition, the UE would transmit a NACK in the subframe following the HARQ ACK/NACK, unless another HS-DSCH packet follows immediately and is successfully decoded. Such a procedure would keep the Node B from detecting DTX as ACK in the HARQ ACK/NACK subframe, allowing a substantial reduction in the required HS-UP power. Without such a change, the transmit power on the HS-DPCCH for ACK/NACK fields would have to be much higher than with the change. An accompanying technical document—R1-02-1085 entitled *Reduction of HS-DPCCH power requirements* (agenda item 7.4)—gives a detailed discussion.

The additional preamble/postamble signalling according to the prior art promises possible improved gain at the Node B (in determining whether the UE is in HARQ active mode or DTX mode) compared to the current signalling scheme, at least in case of random errors on HS-SCCH (which then causes the UE to enter DTX mode). However, in soft handover, it turns out that errors on HS-SCCH tend to be bursty and, it also turns out, the additional preamble/postamble signalling according to the prior art is less effective than in case of random errors. In addition, in recent prior art approaches, 'HARQ inactivity mode,' which in the earlier approaches was indicated as DTX transmission, is converted to look like NACK transmission, making inactivity appear similar to unsuccessful reception. While preamble/postamble signalling according to the prior art does likely improve gain in case of random errors, it should not be used when incremental redundancy (IR) is applied in HARQ (because, for one thing as explained above, the recent prior art preamble/postamble signalling makes it difficult to distinguish HARQ inactivity from unsuccessful decoding, which are both indicated by sending NACK), or in other words, IR and preamble/postamble signalling are mutually exclusive techniques to improve performance of HSDPA.

More importantly, there are sequences of 'inactivity' in which a UE still sends DTX (i.e. enters DTX mode), but the Node B expects a response of either ACK or NACK. For example, when three HS-SCCH control subframes are lost in sequence, a UE will send a sequence: NACK-DTX-NACK. The Node B might easily decode this as the sequence: NACK-ACK-NACK.

In an earlier suggestion, a long sequence of NACK is sent after relevant ACK/NACK symbols. Such a sequence cannot indicate for the Node B when a UE is in DTX mode, and, in addition, results in what is an often an unnecessary uplink transmission.

Thus, what is needed is a way by which a UE can signal to a Node B via HS-UP information the Node B can use to more readily determine when the UE is in DTX mode, especially during soft handover, where errors are bursty.

SUMMARY OF THE INVENTION

Accordingly, the present invention provides a method for use in connection with discontinuous signaling by a signal-transmitting entity in communication with a signal-receiving entity, the method for use by the signal-transmitting entity in indicating to the signal-receiving entity during a current time interval a state (signaling active state, DTX state) from among a plurality of different possible states in which the signal-transmitting entity occupies in a time interval in which the signal-transmitting entity either signals all or part of a payload message to the signal-receiving entity or exists in discontinuous mode, wherein the payload message is transmitted in a predefined offset of one or more time intervals from the current time interval and the payload message comprises a sequence of payload message symbols selected from a set of possible payload message symbols, the method characterized in that it comprises: a step in which in order to indicate whether the payload message is being or was transmitted in a predefined positive or negative offset of one or more time intervals from the current time interval, the signal-transmitting entity additionally signals in the current time interval an indication symbol providing preamble or postamble signalling; and further characterized in that the indication symbol differs from each of the possible payload message symbols, and in that the indication symbol is sent either in advance of or after the payload message.

In accord with the first aspect of the invention, the indication symbol can be one or another symbol selected from a predetermined group of symbols, and the indication symbol sent may be selected based on when the time interval in which the payload is sent or was sent occurs, compared to the current time interval.

Also in accord with the first aspect of the invention, the payload provided by the signal-receiving entity may be provided on a feedback channel as feedback to the signal-receiving entity for data transmitted over a data-transmission channel by the signal-receiving entity, and in response to receiving and successfully decoding a data signal provided by the data-transmitting entity, the signal-transmitting entity may provide to the signal-receiving entity a corresponding acknowledgement message (ACK/NACK) in one of the sequence of time intervals corresponding to the time of receipt of the data signal in a predetermined way, and, in addition, the method may be characterized by further comprising: a step in which the data-receiving entity additionally provides a preamble symbol in the current time interval if an acknowledgement message (ACK/NACK) is to be sent in the next time interval but not in the current time interval. The method may be yet further characterized in that if neither an acknowledgement message nor a preamble symbol is to be sent in the current time interval, and an acknowledgement message was sent in the previous time interval, then a step is performed in which the signal-transmitting entity additionally provides at least one postamble symbol in one or more respective consecutive time intervals prior to the signal-transmitting entity entering a mode in which it does not transmit on the feedback channel. The method may be even yet further characterized in that in the step in which the signal-transmitting entity additionally provides at least one postamble symbol, the signal-transmitting entity provides two consecutive postamble symbols if neither a preamble symbol nor an acknowledgement message (ACK/NACK) is to be sent in either the current time interval or the next time interval, and acknowledgement messages (ACK/NACK) were sent in the two immediately preceding time intervals. Also further, the method provided may be further characterized in that: a signaling cycle related to the previous, current or next time interval in the feedback channel is adapted according to a minimum applicable interval either in the data-transmission channel or in the feedback channel, whichever minimum applicable interval is higher.

In a second aspect of the invention, a signal-transmitting entity is provided, characterized in that it is operative according to the method provided by the first aspect of the invention.

In a third aspect of the invention, a telecommunication system is provided, including a signal-transmitting entity and a signal-receiving entity, characterized in that the signal-transmitting entity is operative according to the method provided by the first aspect of the invention, and the signal-receiving entity uses the preamble and postamble signalling to determine the current state of the signal-transmitting entity from among the plurality of different possible states.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Referring to FIG. 1, according to the invention, in solving the problem of how to enable a Node B 14 to more readily discern when a UE 12 is in or about to enter DTX mode (discontinuous transmission mode, i.e. not transmitting) on the HS-UP HSDPA channel used for HARQ process signalling and channel quality feedback, new signalling symbols are provided, and a corresponding logic is provided for signalling using the new symbols.

The invention provides a purely protocol layer-one (L1/ called the physical layer) solution, i.e. no new or specific higher layer signalling is needed. The solution supports incremental redundancy without any mode switching. Simulated power offset reduction predicts nearly ~6 dB gain under soft handover conditions, but somewhat lower gain is expected in case of a power balanced radio link.

The signalling according to the invention is as follows: the UE 12 sends as usual an ACK or NACK symbol when there is a relevant HARQ response to be made (following the timing conditions assumed in the current specification), i.e. upon receiving and having attempted to decode a packet provided by the Node B 14 via HS-DPCH. In addition, and as opposed to a normal HARQ procedure, the UE 12 sends preamble symbols and postamble symbols, such as given below, under the following conditions: First, the UE sends a preamble symbol when it is to provide a relevant HARQ response (ACK or NACK) in the next subframe, but not in the current subframe. Second, the UE sends a first postamble symbol when there is no relevant HARQ response for either the current subframe or for the next subframe but a HARQ response was sent in the previous subframe. Third, the UE sends a second postamble symbol if immediately previous to the first postamble symbol, at least two consecutive HARQ responses were sent. Fourth, when the condition for sending a preamble symbol in a subframe occurs, whether the UE would otherwise send a postamble symbol in the subframe or would be in DTX mode for the subframe, the UE instead sends a preamble symbol.

From the perspective of the Node B 14, a preamble symbol indicates that a DTX mode condition at the UE 12 is about to end, or that there is a break in a sequence of ACK/NACK symbols. A postamble, on the other hand, indicates that there is no valid response foreseen, and DTX mode is possible.

Figure 2:
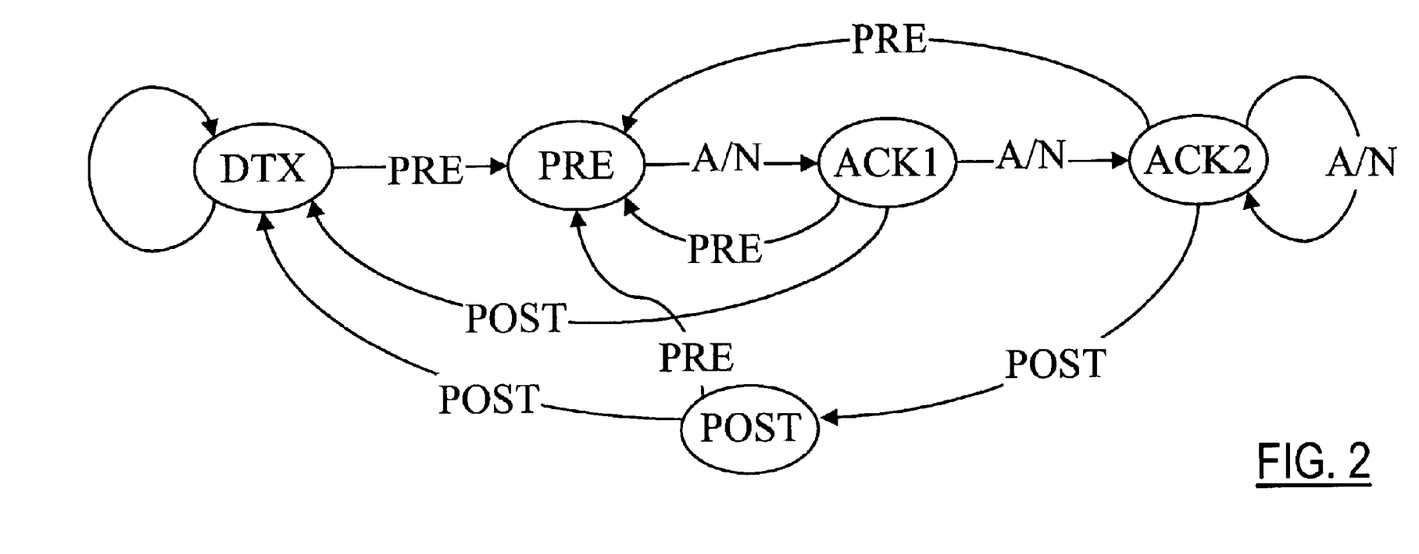
FIG. 2 is a state transition diagram for state transitions by a UE in signalling to a Node B according to the invention.

Referring now to FIG. 2, a state transition diagram is shown in accord with the additional preamble/postamble signalling according to the invention, the additional preamble/postamble signalling indicating to the Node B 14 a change in the signalling state of the UE 12 from any one of a number of signalling states—such as HARQ active or DTX mode—to any other of the number of signalling states.

Figure 3:
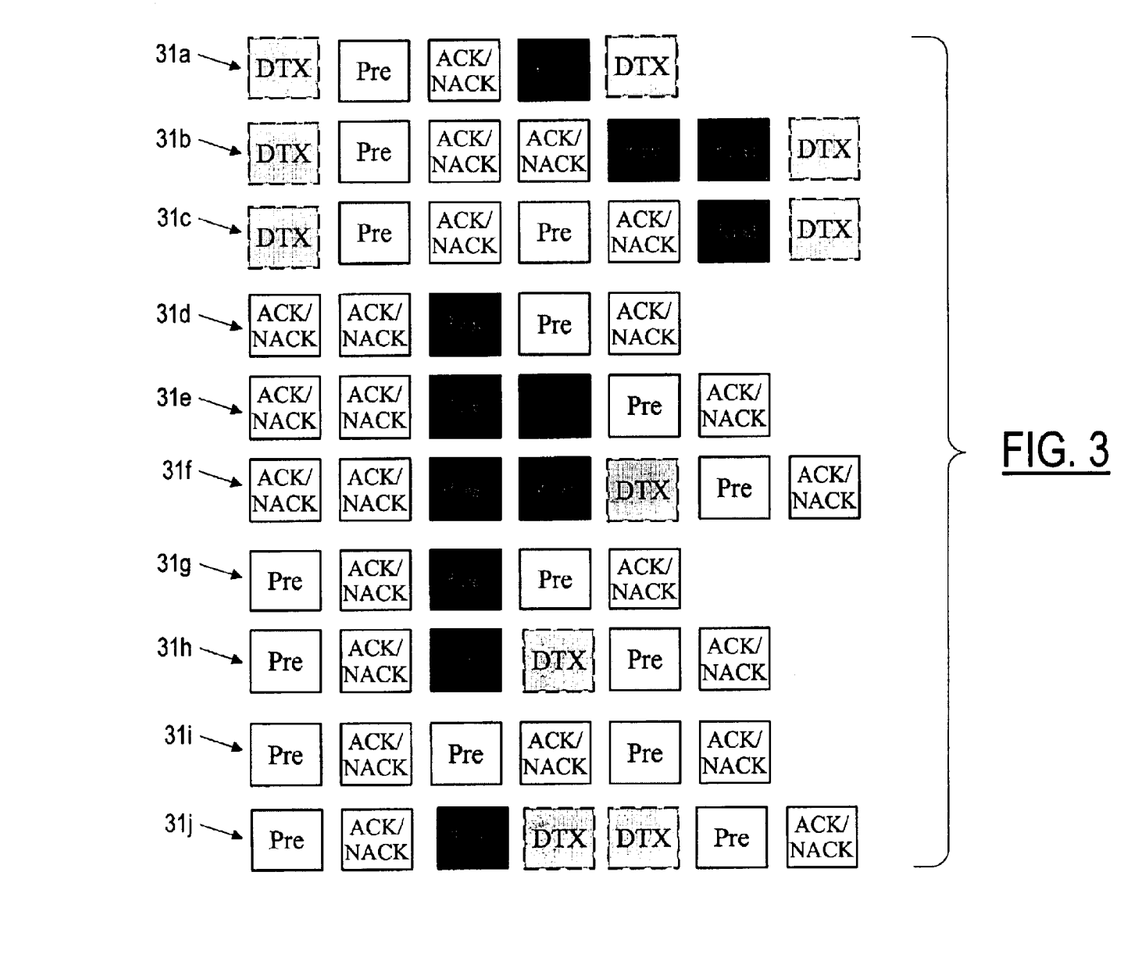
FIG. 3 is a schematic illustrating different possible feedback signalling according to the invention, i.e. different sequences of symbols and DTX mode, all according to the state transition diagram of FIG. 2.

Referring now to FIG. 3, various signalling sequences 31a–j are shown according to the invention and so in accord with the state transition diagram of FIG. 2. For example, in signalling sequence 31b, in which the Node B sends data for the UE via HS-DSCH in say an $n+2^{nd}$ and $n+3^{rd}$ subframe, the UE 12 (FIG. 1) is in DTX mode until the nth subframe, and then, since in the $n+2^{nd}$ subframe the UE expects to send an ACK or an NACK symbol (depending on whether or not it is able to decode data in a corresponding subframe on HS-DSCH) based on signalling by the Node B via HS-SCCH, the UE sends a preamble (PRE) symbol in the $n+1^{st}$ subframe. It then sends an ACK or NACK symbol in the $n+2^{nd}$ and $n+3^{rd}$ subframes. Since it has then sent two consecutive ACK/NACK symbols, and the condition for sending another preamble symbol is (assumedly) not met, the UE sends two consecutive postamble (POST) symbols and then enters DTX mode. The signalling sequence 31b should be contrasted with e.g. signalling sequence 31h in which only a single postamble symbol is sent before entering DTX mode because only a single ACK/NACK symbol is sent previous to the postamble symbol, and also contrasted with signalling sequence 31d in which again only a single postamble symbol is sent before entering DTX mode because even though two consecutive ACK/NACK symbols are sent immediately preceding the postamble symbol, the condition for sending a preamble symbol occurs before a second postamble symbol can be sent.

Since any of the four symbols—ACK, NACK, preamble symbol or postamble symbol—may follow either an ACK or NACK symbol, for the NACK, preamble and postamble, bit sequences are preferably biased well apart from the bit sequence for the ACK symbol. The following symbol set may be used:

| ACK:       | +1 | +1 +1 | +1 | +1 +1 | +1 | +1 +1 | +1 |
|------------|----|-------|----|-------|----|-------|----|
| NACK:      | −1 | −1 −1 | −1 | −1 −1 | −1 | −1 −1 | −1 |
| Preamble:  | −1 | −1 +1 | −1 | −1 +1 | −1 | −1 +1 | −1 |
| Postamble: | −1 | +1 −1 | −1 | +1 −1 | −1 | +1 −1 | −1 |

The bit sequence of the above symbol set uses 10 bits per symbol and is applied per ACK/NACK slot within a subframe. (The 2 remaining slots in subframe are reserved for CQI transmission.) The three times repeated pairs of bits (underlined) for the four symbols make up a bi-orthogonal code set of four included symbols/sub-symbols (+1+1+1+1+1+1, −1−1−1−1−1−1, −1+1−1+1 . . . ) and the remaining four bits of each symbol besides the ACK symbol are opposite in polarity to the corresponding bits in the ACK symbol. Thus the ACK symbol is well apart (in a code distance sense) from each of the other three symbols, and accordingly, throughput of ACK is not severely degraded. At the same time, significant gain is achieved in that a Node B receiver need not consider as a possibility that a UE is in DTX mode without forewarning.

It should be understood that although the invention has been described in the context of HSDPA signalling according to the Release 5 UTRAN specifications, it is for more general use. The invention provides a method for use by any data-receiving entity (which may be a wireless terminal such as a mobile station or may be any other wireless terminal, even a Node B) in indicating for a current time interval (such as a subframe in Release 5 for HSDPA) to a data-transmitting entity (any kind of wireless terminal) a current state of the data-receiving entity in respect to a feedback channel (the current state being e.g. either a preamble symbol transmitting state, or an ACK or NACK transmitting state, or a postamble transmitting state, or a non-transmitting i.e. DTX state), in arrangements in which the data-receiving entity provides a positive or negative acknowledgement message (i.e. an ACK or NACK symbols) to the data-transmitting entity in response to receiving and successfully decoding a data signal (i.e. a packet) provided by the data-transmitting entity, the acknowledgement message being provided in a time interval corresponding to the time when the data-receiving entity received the data signal in some predetermined way (the correspondence being indicated above by using the same subframe number for corresponding subframes on the different HSDPA channels), the method in particular including a step in which the data-receiving entity additionally provides a preamble symbol in the current time interval if an acknowledgement message is to be sent in the next time interval but not the current time interval; and, if neither an acknowledgement message nor a preamble symbol is to be sent in the current time interval, and an acknowledgement message was sent in the previous time interval, a step in which the data-receiving entity additionally provides at least one postamble symbol in one or more respective consecutive time intervals immediately prior to the data-receiving entity entering a mode in which it does not transmit on the feedback channel.

Figure 4:
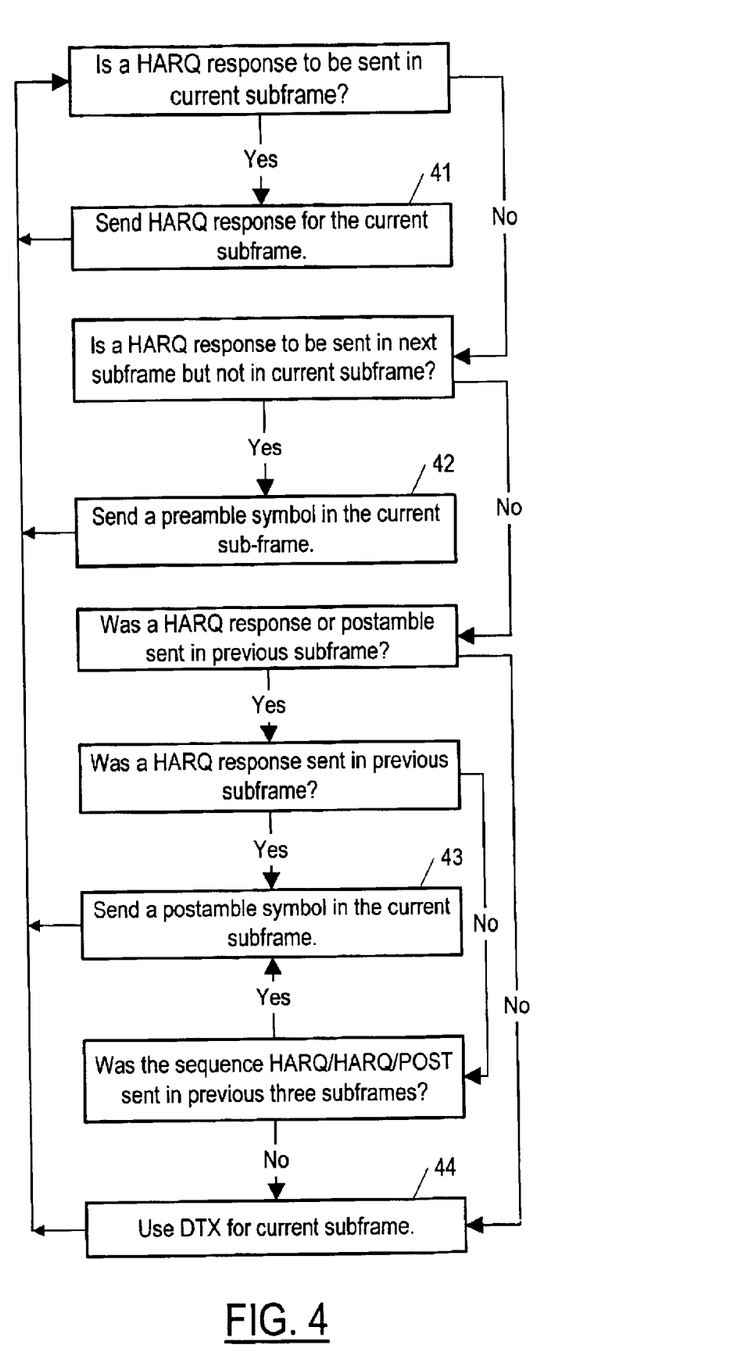
FIG. 4 is a flow chart for signalling according to the invention, and represents another perspective from that provided by the state transition diagram of FIG. 2.

Referring now to FIG. 4, the invention is shown from the perspective of a procedure performed by a UE in communication with a Node B, beginning with one or another step depending on whether a HARQ response is to be sent in the current subframe. If so, then in a step 41 the UE sends a HARQ response and the procedure then restarts. If not, then the UE determines whether a HARQ response is to be sent in the next subframe but not in the current subframe. If so, then in a step 42, the UE sends a preamble symbol in the current subframe, and the procedure then restarts. If not, then the UE next checks whether a HARQ response or postamble was sent in the previous subframe. If so, and if it is also true that a HARQ response was sent in previous subframe, then in a step 43, the UE sends a postamble symbol in the current subframe. The UE also performs the step 43 of sending a postamble symbol in the current subframe and then restarting the procedure if, even though a HARQ response was not sent in the previous subframe, the sequence HARQ/HARQ/POST was sent in the previous three subframes. Finally, in a step 44, the UE uses DTX for the current subframe if according to the procedure it is not to send a preamble symbol, a postamble symbol, or a HARQ response for the current subframe.

The repetition for preamble symbols is constrained to be at most two subframes on account of UE timing conditions. For repetition of the other symbols used in the invention, the repetition can be up to four times. A fulfilled condition for sending a preamble symbol may terminate a repeated postamble transmission or DTX mode in any subframe when it is at most two subframes in advance of a first ACK or NACK symbol transmission because a UE cannot detect the condition for upcoming transmission of ACK or NACK more than two subframes in advance, due to HS-SCCH timing conditions. The basic idea is to signal at a feasible rate just allowed by repetition for the three other symbols (i.e. to signal at the highest rate possible and allowed by repetition), while the timing condition constrains transmission of preamble symbols.

In addition, when a UE has a minimum inter-TTI interval higher than one TTI (i.e. when the minimum interval between TTIs in which a UE receives data is more than one TTI), the ACK/NACK and postamble symbol interval is according to the minimum inter-TTI interval and the preamble symbol interval is two subframes in advance of the first ACK or NACK symbol transmission. Higher repetition in case of such a UE may overrule the minimum inter-TTI interval criteria. The advantage of delayed postamble transmission is maximum performance gain with minimum overhead from added transmissions.

Thus, the invention provides a reduced signaling rate from a UE to a Node B, with the rate according to the minimum inter-TTI interval for the UE (i.e. the minimum interval between TTIs in which a UE receives data) or the repetition (of ACK/NACK signalling) value being used, whichever is higher (the repetition being the semi-static parameter with a value provided by higher-layer signalling and communicated to both the UE and Node B, and having the specified value until the value is changed). Further, the invention provides that the HARQ signaling (interval) and related pre/post coding (interval) adapts accordingly, where higher/longer interval due to above two factors defines the useful signaling interval and rate. In general, according to the invention, the signalling rate is modified and optimized according to highest possible rate of data transmission as constrained due to ACK/NACK repetition or due to the minimum inter-TTI interval capability of the UE.

By way of further explanation, it is prior art related to 3GPP/HSDPA that there are UE classes with different minimum inter-TTI intervals and configurable repetition. Further, it is also prior art that the worst of these two factors constrains both the data transfer rate and the related ACK/NACK transmission rate. Also, the prior art provides for adjusting the data transmission and HARQ signalling interval based on higher-layer signalling and related rules followed both in the UEs and the Node Bs. What the present invention provides is to use the same adapting of the interval when deciding and sending preamble and postamble symbols.

The present invention thus optimizes sending preamble/postamble symbols (minimizes the number of preamble/postamble symbols sent) when data are transmitted (from the Node B to the UE) at the maximum possible rate, with the sending of preamble/postamble symbols as constrained by the above two factors, so that the smallest number of preamble or postamble symbols are sent, while allowed intervals are typically occupied by ACKs or NACKs.

Regarding repetition of ACK/NAK symbols in successive subframes and minimum inter-TTI interval of two or three TTIs: When the repetition is two subframes, all of the above runs in cycles of two subframes, i.e. everything is repeated once. When repetition is lower than the minimum inter-TTI interval, the cycle is according to the larger inter-TTI interval, but the repetition does not fill the cycle entirely; instead some subframes are in DTX. Further, preamble symbols cannot be sent earlier than two subframes before the related ACK or NACK. Accordingly, the preamble based on the 'next subframe' as described above really starts two subframes before a next ACK/NACK is sent. A UE has 2.3 ms to process a HS-SCCH subframe up to the CRC, which is all that is needed to decide if a preamble or postamble symbol is to be sent.

When repetition is three or four, the HS-SCCH/CRC for the next HARQ cycle is assumed available two subframes in advance. A preamble is then sent in a maximum of two (consecutive) subframes, regardless of the repetition factor. In case of a repetition factor of three or four, the gain realized by the invention is less, but a repetition of three or four is believed to be more essential for CQI than for ACK/NACK. One or two postamble symbols are sent after ACK/NACK (when not ACK/NACK in 'next subframe')

before pre/postamble switching is possible (if ACK/NACK next or not). Outcome is that postamble is repeated according to repetition factor if not interrupted by preamble.

In case of a UE with a capability for minimum inter-TTI interval of two or three, the pre/postamble cycle is accordingly two or three subframes, or according to repetition factor if it is larger than the minimum inter-TTI interval. However, the preamble is delayed by one subframe when the minimum inter-TTI interval is three. In this case, the postamble indicates no ACK/NACK now (for the current subframe), and a later preamble indicates ACK/NACK after two subframes. If UE timing would be a critical issue, the preamble delay could be two subframes, and to compensate, no repetition for the preamble.

If data scheduling does not match with the repetition period or the minimum inter-TTI interval, the UE continues first postamble transmission and then enters DTX mode, until a preamble is to be sent. The Node B's HS-DPCCH receiver (L1) should know scheduling on subframe resolution or there would be a DTX detection problem.

Figure 5:
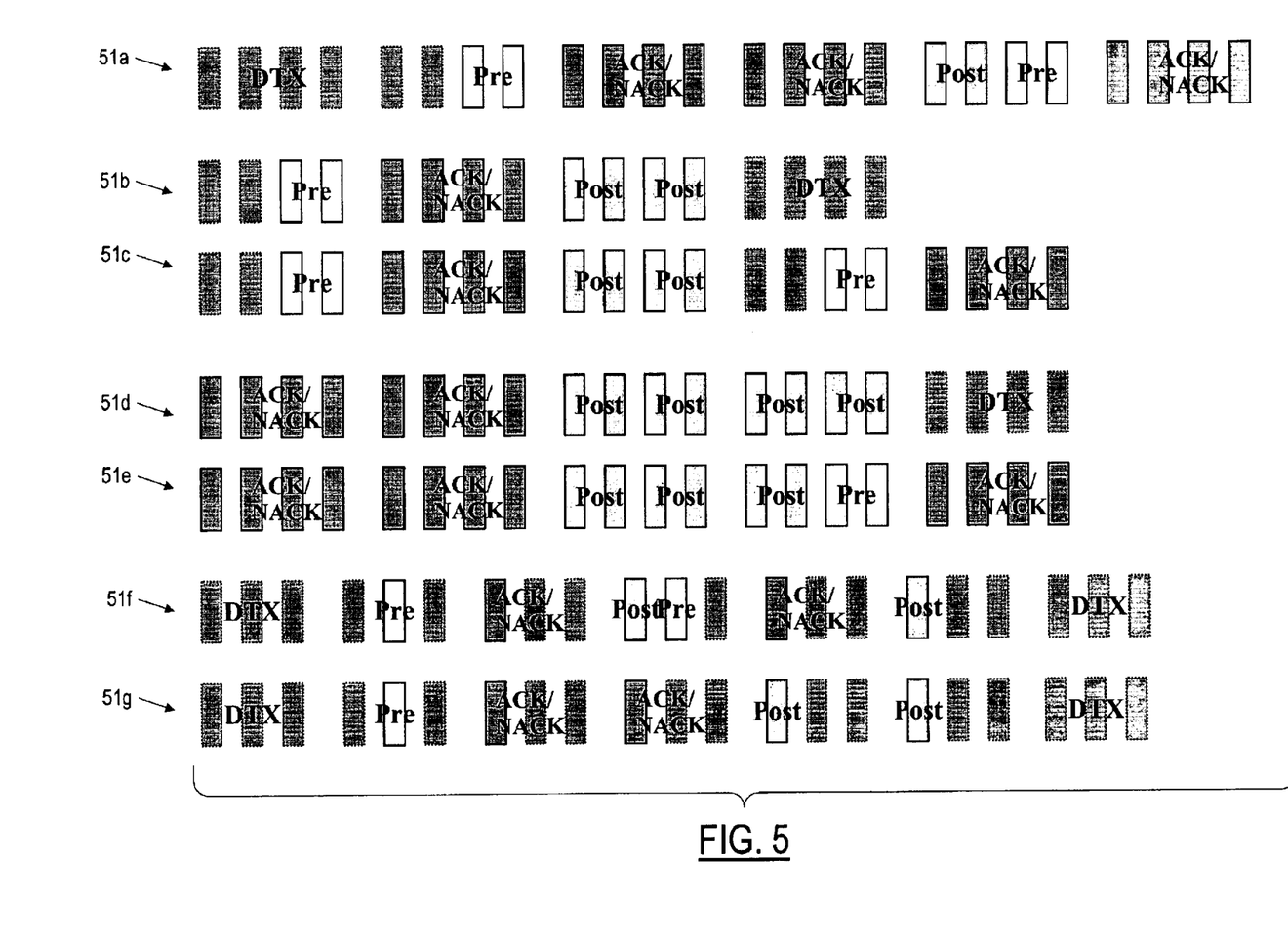
FIG. 5 is another schematic illustrating different possible signalling according to the invention, and also illustrating repetition.

Referring now to FIG. 5, in signalling sequences 51a to 51e, the repetition is four, and repetition overrules the minimum inter-TTI interval. So the UE capability could be either one, two or three. As provided by the prior art for 3GPP HSDPA, the repetition is configured by higher-layer signaling, and it is assumed known by the UE and Node B; it is initiated either by the RNC or the Node B. The minimum inter-TTI interval is characteristic of the UE, and it is communicated to the Node B by higher-layer signaling too. (The statement earlier that the invention provides a 'pure L1 solution' applies only to mode switching, which is not needed with this signalling approach.)

Still referring to FIG. 5, since the repetition is (at least) four in 51a to 51e (i.e. ACK/NACK signaling is done in four successive subframes), the cycle is also accordingly four. (Thus, ACK/NACK and POST symbols can all each be repeated in four successive subframes, but as explained above, the UE can detect a condition for sending a PRE symbol no more than two subframes in advance of the next ACK/NACK.) A PRE symbol may interrupt DTX mode or a repeating POST symbol during a cycle/frame (e.g. 51a, during the second cycle and just before third subframe, DTX is interrupted by sending two successive PRE symbols, and sending POST symbols in the fifth cycle is interrupted after two repetitions (instead of four) to send PRE symbols in advance of anticipated ACK/NACK signaling). In signalling sequences 51f and 51g, the minimum inter-TTI interval is three and the repetition is one (i.e. no repetition, as is seen by noting that at most one POST symbol occurs at a time); the cycle is also three (i.e. there are three subframes per cycle), and ACK, NACK or POST is sent in the first subframe of the cycle of three subframes. However, the PRE can be sent no earlier than in the second subframe of the cycle. It may happen that an unnecessary POST was already sent in the preceding first subframe, such as in signaling sequence 51f, in the fourth cycle. The remaining subframes will be in DTX mode, i.e. no transmission in the ACK/NACK field.

In interpreting the signalling by a UE according to the invention, a Node B receiver may apply sequential decoding based on the coding rules adhered to by the UE (i.e. so as to decode by selecting the most likely allowed sequence of symbols), as opposed to decoding the received symbols on an individual symbol-by-symbol basis. Further, the receiver may adapt its algorithms and decision criteria based on the received symbol sequence, i.e. according to related state when referring to state diagram (FIG. 2).

Besides the embodiments described above, as would be clear to one skilled in the art from the description given the invention also encompasses sending always one or always two postambles in sequence, if not interrupted by a preamble due to foreseen relevant ACK or NACK. In both additional embodiments (sending always one or always two postambles), the related state diagrams are simplified compared to the state diagram (FIG. 2) for the embodiments described earlier. In the embodiment in which one postamble is sent, some of the sequential distance with transition to DTX state is lost. In the embodiment in which two postambles are sent, the postamble signaling overhead is somewhat increased.

As is clear from the description above, the invention is also of use in applications other than for providing feedback to data retransmission. The invention allows signalling by one entity to another an indication that the one entity is to either provide signalling—such as for example feedback signalling—or enter DTX mode in an upcoming time interval. Another example is radio resource management-related signaling, where the need to transfer signaling is discontinuous, e.g. due to transport errors or due to signaling message is triggered by some condition.

Thus, in a more generic sense, the invention provides, via a signalling channel, reliable narrow-band signaling for various applications where the signaling can be discontinuous (DTX mode). The signaling channel is characterized by predefined time intervals for possible transmission of signaling messages from a signal-transmitting entity to a signal-receiving entity. When there is no signaling message to send in a time interval, the signal-transmitting entity sometimes (as for example set out above) sends specific preamble symbols and sometimes sends specific postamble symbols or a predefined sequence of such symbols, whereas in the prior art nothing is sent, which saves transmission power and reduces system interference, but makes it difficult for the signal-receiving entity to distinguish the DTX mode from an active message symbol or sequence. The signalling of specific preamble and postamble symbols or a predefined sequence of such symbols according to the invention helps the signal-receiving entity to identify more reliably any transition between active signaling and DTX mode.

From the standpoint of the invention, the signal-transmitting entity provides special preamble and postamble signals in addition to the normal signalling (such as HARQ signalling), and so, as is usual in communications terminology, the full set of signalling can be viewed as having two parts: payload signalling, i.e. the normal signalling; and state signalling or control signalling, i.e. the signalling of the preamble and postamble symbols according to the invention.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by a feedback-signal-transmitting entity (12) in indicating to a feedback-signal-receiving entity (14) during a current time interval one or another state in a plurality of different possible states in any one of which the feedback-signal-transmitting entity can exist in any time interval in which the feedback-signal-transmitting entity either signals all or part of a payload message to the feedback-signal-receiving entity or instead operates in discontinuous mode, wherein the payload message is sent in response to a packet previously transmitted by the feedback-signal-receiving entity and conveys feedback indicating whether the packet was successfully received, and is transmitted in a predefined offset of one or more time intervals from the current time interval, and comprises a sequence of payload message symbols selected from a set of possible payload message symbols, the method comprising:

the feedback-signal-transmitting entity signalling in the current time interval an indication symbol providing preamble or postamble signalling, in order to indicate whether the payload message is being or was transmitted in a predefined positive or negative offset of one or more time intervals from the current time interval;

wherein the indication symbol differs from each of the possible payload message symbols, and the indication symbol is sent either in advance of or after the payload message.

2. A method as in claim 1, wherein the indication symbol is selected based on when the time interval in which the payload message is sent or was sent occurs compared to the current time interval.

3. A method as in claim 1, wherein the payload message provided by the feedback-signal-transmitting entity is provided on a feedback channel as feedback to the feedback-signal-receiving entity for data transmitted over a data-transmission channel by the feedback-signal-receiving entity, wherein in response to receiving and successfully decoding a data signal, received at a time of receipt, provided by the feedback-signal-transmitting entity, the feedback-signal-transmitting entity provides to the feedback-signal-receiving entity a corresponding acknowledgement message a time intervals corresponding to the time of receipt of the data signal in a predetermined way; and wherein in providing the indication symbol, the feedback-signal-transmitting entity provides as the indication symbol a preamble symbol in the current time interval if an acknowledgement message is to be sent in the nex time interval but not in the current time interval.

4. A method as in claim 3, wherein a signaling cycle related to the previous, current or next time interval in the feedback channel is adapted according to a minimum applicable interval either in the data-transmission channel or in the feedback channel, whichever minimum applicable interval is higher.

5. The method of claim 3, wherein if neither an acknowledgement message nor a preamble symbol is to be sent in the current time interval, and an acknowledgement message was sent in the previous time interval, then the feedback-signal-transmitting entity provides as the indication symbol at least one postamble symbol in one or more respective consecutive time intervals prior to the feedback-signal-transmitting entity entering a mode in which it does not transmit on the feedback channel.

6. A method as in claim 5, wherein a signaling cycle related to the previous, current or next time interval in the feedback channel is adapted according to a minimum applicable interval either in the data-transmission channel or in the feedback channel, whichever minimum applicable interval is higher.

7. The method of claim 5, wherein in providing at least one postamble symbol, the feedback-signal-transmitting entity provides two consecutive postamble symbols as the indication symbol and a second indication symbol, if neiter a preamble symbol nor an acknowledgement message is to be sent in either the current time interval or the next time interval, and acknowledgement messages were sent in the two immediately preceding time intervals.

8. A feedback-signal-transmitting entity operative according to the method of claim 1.

9. A feedback-signal-transmitting entity operative according to the method of claim 2.

10. A feedback-signal-transmitting entity, operative according to the method of claim 3.

11. A telecommunication system, including a feedback-signal-transmitting entity and a feedback-signal-receiving entity, wherein the feedback-signal-transmitting entity is operative according to the method of claim 1, and the feedback-signal-receiving entity is configured to use the preamble and postamble signalling to determine the current state of the signal-transmitting entity from among the plurality of different possible states.

12. A telecommunication system, including a feedback-signal-transmitting entity and a feedback-signal-receiving entity, wherein the feedback-signal-transmitting entity is operative according to the method of claim 2, and the feedback-signal-receiving entity is configured to use the preamble and postamble signalling to determine the current state of the feedback-signal-transmitting entity from among the plurality of different possible states.

13. A method as in claim 1, wherein the payload message symbols include an ACK and a NACK symbol, and the possible indication symbols include either at least a preamble symbol or a postamble symbol, and further wherein the payload message symbols and the possible indication symbols are each different sequences of a same predetermined size.

14. A method as in claim 13, wherein the payload message symbols and the possible indication symbols each include a bi-orthogonal code set.

15. A method as in claim 14, wherein the payload message symbols and the possible indication symbols each include some bits making up the bi-orthogonal code set and additional bits, and the additional bits of each symbol besides the ACK symbol are opposite in polarity to the corresponding bits in the ACK symbol.

16. A method as in claim 14, wherein the possible indication symbols include both a preamble symbol and a postamble symbol, and the payload message symbols and the preamble and postamble symbols are as follows:

| ACK: | +1 | +1 | +1 | +1 | +1 | +1 | +1 | +1 | +1 | +1 |
|---|---|---|---|---|---|---|---|---|---|---|
| NACK: | −1 | −1 | −1 | −1 | −1 | −1 | −1 | −1 | −1 | −1 |
| Preamble: | −1 | −1 | +1 | −1 | −1 | +1 | −1 | −1 | +1 | −1 |
| Postamble: | −1 | +1 | −1 | −1 | +1 | −1 | −1 | +1 | −1 | −1 | whereby the ACK, NACK, preamble and postamble symbols therefore each include three-times repeated pairs of bit sets each making up a bi-orthogonal code set and the remaining four bits of each symbol besides the ACK symbol are opposite in polarity to the corresponding bits in the ACK symbol.

17. A method, comprising:

a feedback-signal-transmitting entity receiving a packet transmission from a feedback-signal-receiving entity; and the feedback-signal-transmitting entity signalling in a current time interval, in the response to the packet transmission, an indication symbol selected from a set of possible indication symbols, and providing preamble and postamble signalling in order to indicate whether a payload message providing feedback to the packet transmission is being or was transmitted in a predefined positive or negative offset of one or more time intervals from the current time interval;

wherein the payload message includes one or another of various possible payload message symbols and the indication symbol differs from each of the possible payload message symbols, and is sent either in advance of or after the payload message.

18. A method as in claim 17, wherein the payload message provided by the feedback-signal-transmitting entity is provided on a feedback channel as feedback to the feedback-signal-receiving entity for data transmitted over a data-transmission channel by the feedback-signal-receiving entity, wherein in response to receiving and successfully decoding a data signal received at a time of receipt and provided by the feedback-signal-receiving entity, the feedback-signal-transmitting entity provides to the feedback-signal-receiving entity a corresponding acknowledgement message in one of the sequences of time intervals corresponding to the time of receipt of the data signal in a predetermined way:

wherein in providing the indication symbol, the feedback-signal-transmitting entity provides as the indication symbol a preamble symbol in the current time interval if an acknowledgement message is to be sent in the next time interval but not in the current time interval.

19. A method as in claim 17, wherein the payload message symbols include an ACK and a NACK symbol, and the possible indication symbols include either at least a preamble symbol or a postamble symbol, and further wherein the payload message symbols and the possible indication symbols are each sequences of ten bits.

20. A feedback-signal-transmitting apparatus, comprising:

means for receiving a packet transmission from a packet-transmitting appratus; and means responsive to the packet transmission. for signalling in a current time interval an indication symbol selected from a set of possible indication symbols, and providing preamble or postamble signalling in order to indicate whether a payload message providing feedback to the packet transmission is being or was transmitted in a predefined positive or negative offset of one or more time intervals from the current time interval;

wherein the payload message is configured to include one or another of various possible payload message symbols all differing from the indication symbol, and wherein the apparatus is configured to send the indication symbol either in advance of or after the payload message.

21. A feedback-signal-transmitting apparatus as in claim 20, wherein the apparatus is configured to receive the payload message from the feedback-signal-transmitting apparatus on a feedback channel as feedback to the packet-transmitting apparatus for data transmitted over a data-transmisson channel by the packet-transmitting apparatus, wherein the apparatus is further configured so that in response to receiving and successfully decoding a data signal, received at a time of receipt, provided by the packet-transmitting apparatus and received at a time of receipt occurring in a time interval in a sequence of time intervals, the feedback-signal-transmitting apparatus provides to the packet-transmitting apparatus a corresponding acknowledgement message in a time intervals corresponding to the time of receipt of the data signal in a predetermined way, and wherein the apparatus is further configured so as to provide as the indication symbol a preamble symbol in the current time interval if an acknowledgement message is to be sent in the next time interval but not in the current time interval.

22. A feedback-signal-transmitting apparatus as in claim 20, wherein the payload message symbols include an ACK and a NACK symbol, and the possible indication symbols include either at least a preamble symbol or a postamble symbol, and further wherein the payload message symbols and the possible indication symbols are each sequences of ten bits.

23. A user equipment device including a feedback-signal-transmitting apparatus as in claim 20.

24. A radio access network element including a feedback-signal-transmitting apparatus as in claim 20.

25. A Node B of a radio access network including a feedback-signal-transmitting apparatus as in claim 20.

26. A telecommunication system, including a packet-transmitting apparatus for providing a packet transmission and a feedback-signal-transmitting apparatus as in claim 20 for providing a payload message and the indication symbol in response to the packet transmission.

27. A feedback-signal-transmitting apparatus, comprising:

a receiver for receiving a packet transmission from a packet-transmitting apparatus; and a physical layer, responsive to the packet transmission, for signaling in a current time interval an indication symbol selected from a set of possible indication symbols, wherein the indication symbol provides preamble or postamble signalling in order to indicate whether a payload message providing feedback to the packet transmission is being or was transmitted in a predefined positive or negative offset of one or more time intervals from the current time interval;

wherein the payload message is configured to include one or another of various possible payload message symbols all differing from the indication symbol, and wherein the apparatus is configured to send the indication symbol either in advance of or after the payload message.

28. A feedback-signal-transmitting apparatus, comprising:

a receiver, for receiving a packet from a feedback-signal-receiving entity; and a physical layer, responsive to the packet, for signaling all or part of a payload message to the feedback-signal-receiving entity, wherein the payload message conveys feedback indicating whether the packet was successfully received and is transmitted in a predefined offset of one or more time intervals from a current time interval and comprises a sequence of payload message symbols selected from a set of possible payload message symbols; and wherein, in order to indicate whether the payload message is being or was transmitted in a predefined positive or negative offset of one or more time intervals from the current time interval, the physical layer is configured to signal in the current time interval an indication symbol selected from a set of possible indication symbol providing preamble or postamble signaling, wherein the indication symbol differs from each of the plurality of possible payload message symbols.

29. An apparatus as in claim 28, wherein the apparatus is configured to select the indication symbol based on when the time interval in which the payload message is sent or was sent occurs compared to the current time interval.

30. An apparatus as in claim 28, wherein the apparatus is configured to send the payload message on a feedback channel as feedback to the feedback-signal-receiving entity for data transmitted over a data-transmission channel by the feedback-signal-receiving entity, wherein the feedback-signal-transmitting apparatus is configured so that upon receiving and successfully decoding a data signal, received at a time of receipt, provided by the feedback-signal-receiving apparatus the feedback-signal-transmitting entity provides to the feedback-signal-receiving entity a corresponding acknowledgement message in a time intervals corresponding to the time of receipt of the data signal in a predetermined way, and wherein the apparatus is configured to provide as the indication symbol a preamble symbol in the current time interval if an acknowledgement message is to be sent in the next time interval but not in the current time interval.

31. An apparatus as in claim 28, wherein the payload message symbols include an ACK and a NACK symbol, and the possible indication symbols include either at least a preamble symbol or a postamble symbol, and further wherein the payload message symbols and the possible indication symbols are each different sequences of a same predetermined size.

32. An apparatus as in claim 28, wherein the payload message symbols and the possible indication symbols each include a bi-orthogonal code set.

33. An apparatus as in claim 32, wherein the payload message symbols and the possible indication symbols each include some bits making up the bi-orthogonal code set and additional bits, and the additional bits of each symbol besides the ACK symbol are opposite in polarity to the corresponding bits in the ACK symbol.

34. An apparatus as in claim 28, wherein the possible indication symbols include both a preamble symbol and a postamble symbol, and the payload message symbols and the preamble and postamble symbols are as follows:

| | | | | | | | | | |
|---|---|---|---|---|---|---|---|---|---|
| ACK: | +1 | +1 +1 | +1 | +1 +1 | +1 | +1 +1 | +1 |
| NACK: | −1 | −1 −1 | −1 | −1 −1 | −1 | −1 −1 | −1 |
| Preamble: | −1 | −1 +1 | −1 | −1 +1 | −1 | −1 +1 | −1 |
| Postamble: | −1 | +1 −1 | −1 | +1 −1 | −1 | +1 −1 | −1 | whereby the ACK, NACK, preamble and postamble symbols therefore each include three-times repeated pairs of bit sets each making up a bi-orthogonal code set and the remaining four bits of each symbol besides the ACK symbol are opposite in polarity to the corresponding bits in the ACK symbol.

* * * * *

UNITED STATES PATENT AND TRADEMARK OFFICE
CERTIFICATE OF CORRECTION

| | | |
|---|---|---|
| PATENT NO. | : 7,116,651 B2 | Page 1 of 1 |
| APPLICATION NO. | : 10/666920 | |
| DATED | : October 3, 2007 | |
| INVENTOR(S) | : Hannu Hakkinen and Esa Malkamäki | |

It is certified that error appears in the above-identified patent and that said Letters Patent is hereby corrected as shown below:

In column 10, line 61, claim 1, line 2, delete "(12)".
In column 10, line 62, claim 1, line 3, delete "(14)".
In column, 11, line 10, claim 1, line 18, after "symbol" insert --selected from a set of possible indication symbols, and--.
In column 11, line 33, claim 3, line 11, delete "intervals" and substitute --interval--.
In column 11, line 39, claim 3, line 17, delete "nex" and substitute --next--.
In column 11, line 65, claim 7, line 7, delete "neiter" and substitute --neither--.
In column 12, line 66, claim 17, line 9, delete "and" and substitute --or--.
In column 13, line 64, claim 21, line 14, delete "intervals" and substitute --interval--.
In column 14, line 63, claim 28, line 22, after "symbols" insert --and the indication symbol is sent either in advance of or after the payload message--.
In column 15, line 11, claim 30, line 11, delete "intervals" and substitute --interval --.

Signed and Sealed this

Sixth Day of November, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,116,651 B2 | Page 1 of 1 |
| APPLICATION NO. | : 10/666920 | |
| DATED | : October 3, 2006 | |
| INVENTOR(S) | : Hannu Hakkinen and Esa Malkamäki | |

It is certified that error appears in the above-identified patent and that said Letters Patent is hereby corrected as shown below:

In column 10, line 61, claim 1, line 2, delete "(12)".
In column 10, line 62, claim 1, line 3, delete "(14)".
In column, 11, line 10, claim 1, line 18, after "symbol" insert --selected from a set of possible indication symbols, and--.
In column 11, line 33, claim 3, line 11, delete "intervals" and substitute --interval--.
In column 11, line 39, claim 3, line 17, delete "nex" and substitute --next--.
In column 11, line 65, claim 7, line 7, delete "neiter" and substitute --neither--.
In column 12, line 66, claim 17, line 9, delete "and" and substitute --or--.
In column 13, line 64, claim 21, line 14, delete "intervals" and substitute --interval--.
In column 14, line 63, claim 28, line 22, after "symbols" insert --and the indication symbol is sent either in advance of or after the payload message--.
In column 15, line 11, claim 30, line 11, delete "intervals" and substitute --interval --.

This certificate supersedes Certificate of Correction issued November 6, 2007.

Signed and Sealed this

Fourth Day of December, 2007

JON W. DUDAS
*Director of the United States Patent and Trademark Office*